Nov. 9, 1926.

R. C. PIERCE

CLAMP

Filed Feb. 9, 1922

1,606,259

Inventor
R. C. Pierce,

By Ivan P. Tashof,

Attorney

Patented Nov. 9, 1926.

1,606,259

UNITED STATES PATENT OFFICE.

RAYMOND C. PIERCE, OF NEW YORK, N. Y.

CLAMP.

Application filed February 9, 1922. Serial No. 535,233.

The present invention relates to a clamp adapted to be connected to a delivery conduit such as the outlet of gas or liquid container valves, for the purpose of delivering such fluids to the containers to be filled. A common case where such apparatus is employed is in the inflation of balloons and air ships with hydrogen or helium from steel cylinders containing these gases. The method of connecting at present employed, consists of screwing a union nut to the valve outlet and passing the gas through a nipple within the union nut to a hose thence through a check valve and then to the air ship. The valves employed on gas cylinders containing inflating gases are usually provided with left hand male threads. The men operating such inflation devices are not mechanics and there is often great delay in connecting up and discharging a sufficient number of gas cylinders to inflate the gas bag.

There are usually a number of such union nuts and hoses connected together to a common cup or manifold and it becomes necessary to provide check valves in each lead to prevent gas from backing up and escaping to the air when the union connections are being changed from cylinder to cylinder. These check valves have always been placed in the manifold or cup and in case these check valves become stuck or frozen shut, the high pressure gas will burst the connecting hose, oftentimes causing fires.
As before stated the valves employed on gas-cylinders containing gases used to inflate balloons usually have left hand threads. Cylinders containing oxygen have right hand threads. If by any chance oxygen is discharged into a hydrogen filled balloon, a violent explosion may take place. If now the only difference between hydrogen and oxygen cylinders is the direction of the outlet valve threads, a safe discharging device to the cylinder valve must connect to the one place which identifies the kind of gas contained in the cylinder, the valve outlet thread. For this reason, I choose to clamp the outlet threads of the cylinder valve, although by so doing I do not limit myself thereto as other constructions such as connecting into a groove cut at the bottom of the thread or around the back of the cylinder valve itself.
Broadly stated, it is the object of the invention to provide a simple efficient clamp admitting of an easy, quick and positive connection to a delivery conduit, comprising a body member adapted to engage a delivery conduit and provided with clamping means and means for imparting to the latter initially a rocking movement and a separate rectilinear movement whereby the clamping means is brought into safe connection with the delivery conduit and thereafter moving the body member into fluid tight connection with the delivery conduit. The body member is preferably provided with a check valve, whereby the difficulty referred to in the introduction is obviated.

The invention accordingly consists in the features of construction, combination of elements and arrangement of parts which will be exemplified in the construction hereinafter set forth and the scope of the application of which will be indicated in the following claims.

The invention is illustrated in its preferred embodiment in the accompanying drawing wherein:—

Figure 1 is a front elevation of the clamp connected to the valve outlet of a fluid container and to a delivery conduit leading to a receiving medium, such as a balloon or air-ship; as shown in Figure 1, the clamp is in what may be called its "open position", that is, the clamp jaws are in engagement with the threads of the valve outlet and the clamp nozzle is out of engagement with the interior of the valve outlet. To bring the clamp to its "closed position" the clamp nozzle is rotated so that it engages the walls of the valve outlet.

Figure 1:
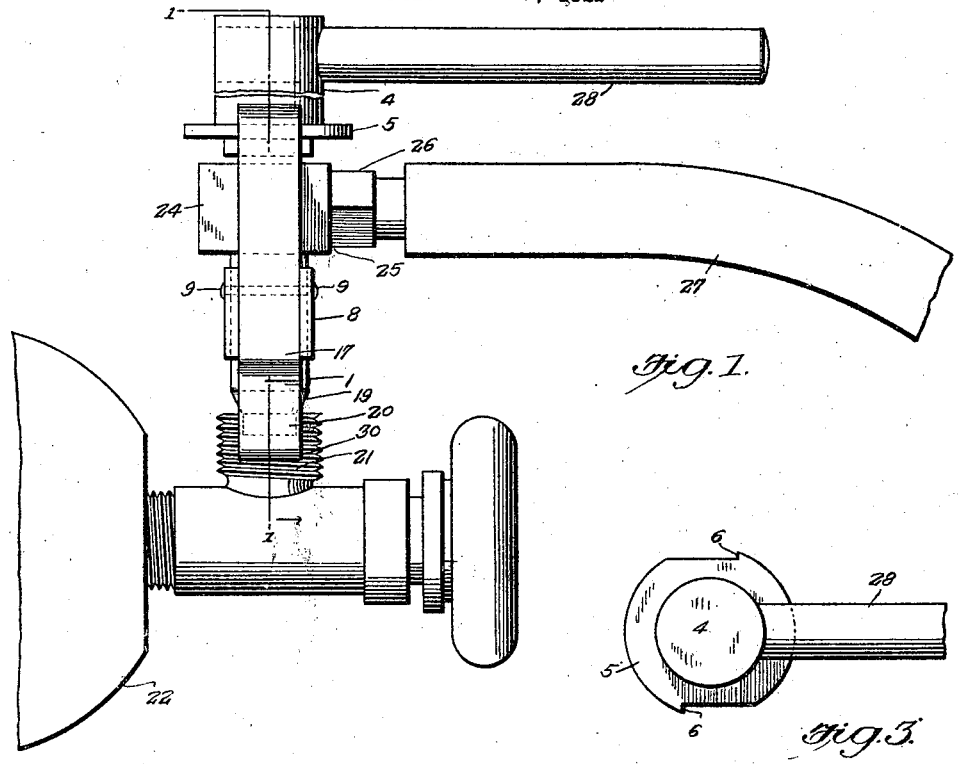
Figure 3:
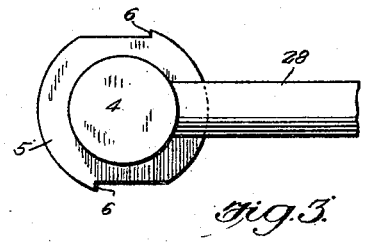
Figure 3 is a plan view of the clamp nut showing the jaw operating cam faces.
Figure 2:
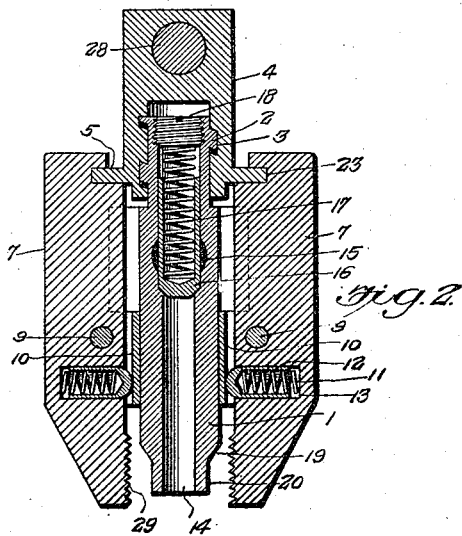
Figure 2 is a vertical section of the clamp taken on line 1—1 of Figure 1;
Figure 4:
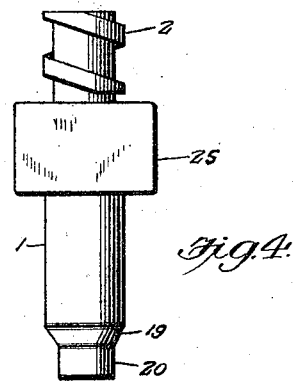
Figure 4 is a front elevation of the clamp body.

Referring to the drawing, the body 1 has its upper portion threaded with a coarse left hand thread 2 which is adapted to co-operate with the female threads 3 of an internally threaded member such as a nut 4 whereby the latter may be turned and caused to move up or down with reference to the body 1. For reasons referred to later, it is usual to cut the female threads 3 slightly wider than the engaging male threads 2 giving the nut 4 and its related elements as hereinafter described a slight rectilinear movement back and forth axially. The lower portion of the nut 4 is provided with an encircling flange 5 cut so as to form cam faces 6ª and cams 6.

Engaging with the flange are two jaws 7 pivotally connected by pins 9 to a sliding collar 8 having interior walls 10 embracing the body 1. The jaws 7 are held in engagement with the flange 5 of the nut 4 by means of springs 11 and plungers 12, bearing on the walls of the apertures 13 of the jaws 7.

The jaws 7 are provided at their upper portions with recesses 23, in which the cam faces 6 are adapted to rest and the flange 5 to turn. The jaws 7 are adapted to rock back and forth within the flanges 24 of the slotted abutment 25 integral with the body 1, the numeral 25 indicating the abutment itself and numerals 24 each flange. The outlet nipple 26 is screwed into one of the flanges 24 and connected with the delivery conduit 27.

The body 1 which is provided with a passage 14 has in its upper portion an outlet 15 controlled by a check valve 16 which lifts against check valve spring 17 and cap 18. The lower portion of the body 1 carries an integral nozzle 20. The shoulder 19 thereof is adapted to fit tightly against wall of the outlet valve 21 of the cylinder 22 thereby insuring a tight joint.

In the embodiment of the invention set forth, when the nut 4 is turned by the bar 28 the cam faces 6 throw the upper parts of the jaws 7 outward and the lower parts inward thereby causing the jaw-threads 29 to engage the male threads 30 of the cylinder valve 21 as shown in Figure 1. A further movement of nut 4 causes the body 1 to move downward and shoulder 19 to be pressed firmly against the walls of the cylinder outlet valve 21 whereby a gas tight joint is insured. In order that the threads 29 of the jaws 7 may freely mesh into the threads 30 of the cylinder valve 21, it is important that shoulder 19 should not be brought into contact with the cylinder valve threads when the nut 4 is first turned. This is provided for by having the female thread 3 of the nut 4 wider than the corresponding male thread 2 on the upper portion of the body 1 thereby allowing the nut 4, the jaws 7 and the sliding collar 8 a slight up and down freedom or rectilinear motion to fall into correct mesh with the valve threads 30, after which further movement of the nut 4 causes the body 1 and the shoulder 19 to be pressed firmly against the walls of the cylinder outlet valve 21 as above described.

Utilizing the construction set forth, fluid tight engagement of the shoulder 19 of the body 1 is not possible until the jaws 7 are clamped into the threads 30 and not on top thereof. The slight up and down motion of the nut 4, jaws 7 and sliding collar 8 which is provided for by the relation of the female thread 3 and the male thread 2 allows the jaw threads 29 the play necessary to insure them clamping into the valve threads 30. This construction insures safety by avoiding the danger of clamping the threads 29 to the top of the threads 30 and then making fluid tight connection, whereby the jaws 7 may be disengaged, especially when attached to gas cylinders containing a gas, such as hydrogen, under a pressure of two thousand pounds per square inch. The arrangement set forth also prevents the unlocking of the clamp from the threads of the cylinder valve until the fluid connection has been loosened thereby warning against disengaging the clamp while fluid pressure is still applied.

In the operation of the clamp, when the fluid outlet valve 21 is opened, the fluid will rush from cylinder 22 through valve 21 upward along the passage 14 of the body 1, lifting the check valve 16 against spring 17 and thereafter passing through outlet 15 to the outlet nipple 26 and delivery conduit 27 to the container to be filled. When the cylinder 22 has been emptied and the clamp has been removed from the cylinder, the check valve 16 will seat and prevent gas from passing back along the delivery conduit 27, nipple 26, outlet 15 and passage 14 to the atmosphere.

It is understood that while the clamp set forth in drawing and described in the specification is the preferred embodiment of my invention, such modifications may be made as will be apparent to those skilled in the art without departing from the scope or spirit of the invention.

I claim—

1. In a clamp, the combination of a body member provided with a fluid passage, having its upper portion threaded and its lower portion adapted to engage a delivery conduit, a sliding collar embracing the body member, jaws pivoted to the collar, and an internally threaded member having threads wider than those of the body member which it engages and provided with a flange for engaging the jaws, the preliminary rotation of the flange moving the jaws on their pivots giving them a slight vertical and horizontal movement and a separate rectilinear movement whereby they may firmly clamp the delivery conduit and the final rotation of which moves the body member into fluid tight connection with the delivery conduit.

2. In a clamp, the combination of a body member with a fluid passage and a check valve therein, having its upper portion threaded and its lower portion adapted to engage a delivery conduit, a sliding collar embracing the body member, jaws pivoted to the collar, and an internally threaded member having threads wider than those of the body member which it engages and provided with a flange for engaging the jaws, the preliminary rotation of the flange moving the jaws on their pivots giving them a slight vertical and horizontal movement and a separate rectilinear movement, whereby they may firmly clamp the delivery conduit and the final rotation of which moves the body member into fluid tight connection with the delivery conduit.

3. In a clamp, the combination of a body member provided with a fluid passage, having its upper portion threaded and its lower portion adapted to engage a delivery conduit, a check valve in the body member-passage, a slotted abutment integral with the body member, a collar embracing the latter, an internally threaded member having threads wider than those of the body member which it is adapted to engage, a flange on said internally threaded member provided with cam faces, jaws pivoted on the collar and engaging the slotted abutment and the flange, the preliminary rotation of which moves the jaws on their pivots, giving them a slight vertical and horizontal movement and a separate rectilinear movement, whereby they may firmly clamp the delivery conduit and the final rotation of which moves the body member into fluid tight connection with the delivery conduit.

4. In a clamp, the combination of a body member provided with a fluid passage and adapted to engage a delivery conduit, clamping means slidably mounted on said body member, and rotatable means engaging said clamping means and said body member, the initial movement of the rotatable means imparting to the clamping means a slight vertical and horizontal movement and a separate rectilinear movement whereby the latter may firmly clamp the delivery conduit and the final movement continuous with the initial movement bringing the body member into fluid tight connection with the delivery conduit.

5. In a clamp, the combination of a body member provided with a fluid passage and adapted to engage a delivery conduit, clamping means slidably mounted on said body member, and rotatable means engaging said clamping means and said body member, the initial movement thereof imparting a rocking and a separate rectilinear movement to said clamping means and bringing the latter into safe engagement with the delivery conduit and the final movement thereof continuous with the initial movement bringing the body member into fluid tight contact with the delivery conduit.

6. In a clamp, the combination of a body member adapted to engage a delivery conduit, clamping means, and rotatable means, the initial rotation thereof imparting to the clamping means a rocking movement and a separate rectilinear movement whereby the clamping means are brought into safe connection with the delivery conduit and the final rotation continuous with the initial rotation moving the body member into fluid tight connection with the delivery conduit.

7. In a clamp, the combination of a body member adapted to engage a delivery conduit and provided with a check valve, clamping means, and rotatable means, the initial rotation thereof imparting to the clamping means a rocking motion and a separate rectilinear movement whereby the clamping means are brought into safe connection with the delivery conduit and the final rotation continuous with the initial rotation moving the body member into fluid tight connection with the delivery conduit.

In testimony whereof I hereunto affix my signature.

RAYMOND C. PIERCE.